(12) United States Patent
Takahashi et al.

(10) Patent No.: US 7,923,408 B2
(45) Date of Patent: Apr. 12, 2011

(54) DIESEL PARTICULATE FILTER AND EXHAUST EMISSION CONTROL SYSTEM

(75) Inventors: Masashi Takahashi, Obu (JP); Hiroshi Tanada, Nagoya (JP); Takuya Yano, Okayama (JP)

(73) Assignees: Mitsubishi Jidosha Kogyo Kabushiki Kaisha, Tokyo (JP); Dowa Electronics Materials Co., Ltd., Tokyo (JP)

( * ) Notice: Subject to any disclaimer, the term of this patent is extended or adjusted under 35 U.S.C. 154(b) by 1004 days.

(21) Appl. No.: 11/707,893

(22) Filed: Feb. 20, 2007

(65) Prior Publication Data

US 2007/0196246 A1 Aug. 23, 2007

(30) Foreign Application Priority Data

Feb. 21, 2006 (JP) ................. 2006-043971

(51) Int. Cl.
*B01J 23/00* (2006.01)
*B01J 21/00* (2006.01)
*B01D 50/00* (2006.01)

(52) U.S. Cl. ........ 502/327; 502/302; 502/303; 502/304; 502/324; 502/328; 502/332; 502/333; 502/334; 502/336; 502/338; 502/339; 502/340; 502/341; 502/349; 502/350; 502/351; 502/355; 502/439; 422/177

(58) Field of Classification Search ................... 502/302, 502/303, 304, 324, 327, 328, 332, 333, 334, 502/336, 338, 339, 340, 341, 349, 350, 351, 502/355, 439; 422/177
See application file for complete search history.

(56) References Cited

U.S. PATENT DOCUMENTS

| | | | | |
|---|---|---|---|---|
| 4,803,134 A * | 2/1989 | Sammells | ........................ | 429/16 |
| 4,950,562 A * | 8/1990 | Yoshida et al. | ................. | 429/32 |
| 5,096,882 A * | 3/1992 | Kato et al. | ...................... | 505/325 |
| 5,426,003 A * | 6/1995 | Spengler et al. | ................ | 429/27 |
| 5,453,330 A * | 9/1995 | Kawasaki et al. | ............... | 429/30 |
| 5,487,356 A * | 1/1996 | Li et al. | ........................... | 117/99 |
| 5,776,359 A * | 7/1998 | Schultz et al. | ......... | 252/62.51 R |
| 5,789,339 A * | 8/1998 | Ziebarth et al. | ............... | 502/303 |
| 5,853,889 A * | 12/1998 | Joshi et al. | ................. | 428/411.1 |
| 5,939,354 A * | 8/1999 | Golden | ........................ | 502/400 |
| 5,977,017 A * | 11/1999 | Golden | ........................ | 502/302 |
| 6,033,632 A * | 3/2000 | Schwartz et al. | ............. | 422/190 |
| 6,143,203 A * | 11/2000 | Zeng et al. | ..................... | 252/373 |
| 6,146,549 A * | 11/2000 | Mackay et al. | ................ | 252/373 |
| 6,352,955 B1 * | 3/2002 | Golden | ........................ | 502/302 |

(Continued)

FOREIGN PATENT DOCUMENTS

EP 1 160 427 A2 12/2001

(Continued)

OTHER PUBLICATIONS

Teraoka et al., Applied Catalysis B: Environmental, vol. 5, 1995, pp. 181-185.

*Primary Examiner* — Cam N Nguyen
(74) *Attorney, Agent, or Firm* — Birch, Stewart, Kolasch & Birch, LLP

(57) ABSTRACT

Diesel particulate filter that can lower the particulate matter (PM) combustion start temperature and use material containing silicon (Si) for a carrier. The carrier, which has a filter function, is allowed to support a perovskite-type complex oxide expressed by formula (1) as follows, wherein $0<x<0.7$ and $0 \leq y \leq 1$: formula $(1)=La_{1-x}Ba_xMn_yFe_{1-y}O_3$.

11 Claims, 5 Drawing Sheets

U.S. PATENT DOCUMENTS

| | | | |
|---|---|---|---|
| 6,355,093 B1 * | 3/2002 | Schwartz et al. | 95/56 |
| 6,372,686 B1 * | 4/2002 | Golden | 502/302 |
| 6,432,474 B1 * | 8/2002 | Nakanishi et al. | 427/126.3 |
| 6,464,955 B2 * | 10/2002 | Zeng et al. | 423/648.1 |
| 6,471,921 B1 * | 10/2002 | Van Calcar et al. | 422/239 |
| 6,489,264 B1 * | 12/2002 | Isupova et al. | 502/302 |
| 6,521,202 B1 * | 2/2003 | Vaughey et al. | 423/599 |
| 6,531,425 B2 * | 3/2003 | Golden | 502/302 |
| 6,569,803 B2 * | 5/2003 | Takeuchi | 502/328 |
| 6,803,140 B2 * | 10/2004 | Sugiyama et al. | 429/33 |
| 6,821,498 B2 * | 11/2004 | Vaughey et al. | 423/599 |
| 6,916,570 B2 * | 7/2005 | Vaughey et al. | 429/30 |
| 6,949,230 B2 * | 9/2005 | Schwartz et al. | 422/198 |
| 7,375,054 B2 | 5/2008 | Eguchi et al. | |
| 2005/0049143 A1 | 3/2005 | Eguchi et al. | |
| 2005/0245391 A1 | 11/2005 | Tanaka et al. | |

FOREIGN PATENT DOCUMENTS

| | | |
|---|---|---|
| EP | 1 304 456 A1 | 4/2003 |
| EP | 1353046 A1 | 10/2003 |
| EP | 1 378 289 A2 | 1/2004 |
| FR | 2 860 734 A1 | 4/2005 |
| JP | 1-142208 A | 6/1989 |
| JP | 6-29542 B2 | 4/1994 |
| JP | 2004-41868 A | 2/2004 |
| JP | 2005-66559 A | 3/2005 |
| WO | WO-97/37760 A1 | 10/1997 |

* cited by examiner

COMBUSTION START TEMPERATURE

TEMP

DIESEL PARTICULATE FILTER AND EXHAUST EMISSION CONTROL SYSTEM

BACKGROUND OF THE INVENTION

1. Field of the Invention

The present invention relates to a diesel particulate filter and an exhaust emission control system for purifying particulate matter (PM) contained in exhaust gas of diesel engines.

2. Description of the Related Art

In diesel engines, particulate matter (hereinafter arbitrarily called "PM") primarily containing carbon particles exists in the exhaust gas (emission). Conventionally, in order to remove this PM, to diesel engines, a filter (diesel particulate filter, hereinafter arbitrarily called "DPF") is installed to the exhaust mechanism and PM is collected by DPF. In addition, in order to meet lowering of DPF functions, the accumulation rate of PM collected in DPF is estimated from exhaust pressure loss and operating history, and periodical combustion purification (DPF regeneration) was carried out or periodical filter replacement was conducted.

However, in the case of regenerating DPF by combusting PM accumulated on DPF, in order to promote PM combustion, in general, a catalyst is equipped to DPF. This catalyst is equipped to combust PM at still lower temperature, and by this, the regenerative property of DPF is intended to be improved. Various kinds of catalysts as described above have been developed to date, and for example, in Japanese Patent Publication No. HEI6-29542, it is proposed to use a perovskite type complex oxide as catalyst.

Temperature of diesel engine exhaust gas is generally low and it is difficult to raise exhaust gas temperature to the temperature to combust PM accumulated in DPF for regeneration during normal operation. Consequently, exhaust gas temperature is, in general, forcibly raised, for regeneration, by post-injection in which fuel is injected in the engine expansion stroke or exhaust stroke or injecting fuel from an injector mounted to the exhaust pipe.

However, forcibly raising exhaust gas temperature by fuel injection may lower fuel economy or deteriorate DPF (primarily, deterioration of a carrier (filter proper) which supports catalyst) by increasing thermal load to DPF. Therefore, as a DPF carrier, material such as SiC, etc. with outstanding heat resistance has been used. However, material such as SiC, etc. is generally expensive and contributes to increased cost.

In addition, when exhaust gas temperature is forcibly raised by fuel injection, previous-step oxidation catalyst is installed to the previous-step part (upstream part) of DPF in order to effectively heat exhaust gas, or subsequent-step oxidation catalyst is installed to the subsequent-step part (downstream part) of DPF in order to oxidize slip HC, which is uncombusted fuel in exhaust gas that has passed DPF. However, these previous-step and subsequent-step oxidation catalysts contribute to high cost, also.

Therefore, it is desired to definitely combust PM to regenerate DPF even at low ambient temperature as is the case of regular operation (continuous regeneration). However, conventional catalyst as set forth in Japanese Patent Publication No. HEI6-29542 does not provide satisfactory performance and continuous regeneration of DPF has not yet been achieved.

Meanwhile, alkali (alkali metal) is an effective catalyst. However, alkali is highly reactive to Si which is frequently contained in the material for DPF filter proper and in the event that alkali is used for DPF catalyst, alkali may degrade the DPF proper.

SUMMARY OF THE INVENTION

The present invention has been created in view of the above problems, and it is an object of the present invention to provide a diesel particulate filter and exhaust emission control system which can lower the PM combustion start temperature than conventional ones.

A diesel particulate filter according to the present invention contains a carrier which has filter functions and a perovskite type complex oxide supported by the carrier and expressed by the following formula (1):

$$La_{1-x}Ba_xMn_yFe_{1-y}O_3 \qquad (1)$$

(where $0<x<0.7$ and $0 \leq y <1$ in formula (1) above).

In such event, in formula (1), it is preferable that $0.1 \leq x \leq 0.6$.

In addition, in formula (1), it is preferable that $y=0$ or $y=1$, also.

Furthermore, it is preferable that the perovskite type complex oxide exists in a particulate form, fine pores are formed in the carrier, and the particle diameter of the perovskite type complex oxide is smaller than the fine pore diameter of the carrier.

In addition, it is preferable that an oxidation catalyst containing at least one kind chosen from Pt, Rh, and Pd is supported by the carrier.

The exhaust emission control system of diesel engines according to the present invention is a diesel particulate filter system installed in an exhaust gas passage of a diesel engine, which contains the diesel particulate filter and a carrier which supports an oxidation catalyst installed separately from the diesel particulate filter.

According to the diesel particulate filter and the exhaust emission control system, the PM combustion start temperature can be lowered than conventional one.

DESCRIPTION OF THE PREFERRED EMBODIMENTS

[I. General Description]

Figure 1:
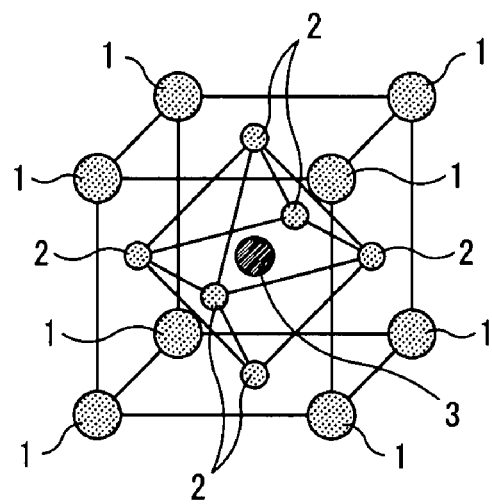
FIG. 1 is a schematic view explaining the perovskite structure.

A diesel particulate filter system (hereinafter arbitrarily called the "DPF system of the present invention") includes a DPF carrier which has filter function, an oxidation catalyst containing at least one kind of noble metal chosen from Pt, Rh and Pd, which are noble metals, (hereinafter arbitrarily called "an oxidation catalyst related to the present invention") and perovskite type complex oxide expressed by the following formula (1) (hereinafter arbitrarily called "perovskite type complex oxide related to the present invention).

(where $0<x<0.7$ and $0\leq y\leq 1$ in formula (1) above).

In addition, the perovskite type complex oxide related to the present invention is supported by the DPF carrier. And the DPF of the present invention is configured with the DPF carrier and the perovskite type complex oxide related to the present invention equipped. On the other hand, the oxidation catalyst related to the present invention may be supported by the DPF carrier or may exist by being supported by a carrier different from the DPF carrier.

[I-1. Carrier]

The DPF carrier used for the DPF system of the present invention functions as a filter proper of the DPF system, and functions as a carrier that supports the catalyst perovskite type complex oxide, also. In addition, it may be able to be used as a carrier which is allowed to support the oxidation catalyst related to the present invention, also.

There is no limitation to this DPF carrier if it has a filter function. Consequently, carriers which are used in conventional DPF can be optionally adopted as far as it can collect PM in exhaust gas. For example, porous materials such as SiC, cordierite, alumina, mullite, and aluminum titanate, may be used in addition to filters simply packed with particles, DPF utilizing metal meshes and foil (metal DPF), etc. Above all, SiC, cordierite, and other porous materials are particularly preferable from the viewpoint in that fine pores of diameters suited for PM collection can be formed and PM can be effectively collected.

Meanwhile, as discussed later, the DPF system of the present invention is able to combust collected PM at a lower temperature than the conventional system. Consequently, it is possible to keep the working environmental temperature of the DPF carrier of the present invention lower than in the conventional technique and the level of heat resistance required for the filter proper can be lowered. Consequently, it is possible to increase the range of selection of materials which can be used as filter proper and it is possible to obtain advantages of cost suppression, improved degree of design freedom, etc.

However, because for the DPF carrier, the heat resistance at least against the temperature exceeding the PM combustion start temperature is required, it is preferable to choose the material which satisfies the requirement.

[I-2. Catalyst]

The DPF system of the present invention includes as catalyst the perovskite type complex oxide related to the present invention which is expressed by the following formula (1). In addition, as required, the system includes an oxidation catalyst containing at least one kind of noble metal chosen from noble metals Pt, Rh and Pd (that is, the oxidation catalyst related to the present invention):

(where $0<x<0.7$ and $0\leq y\leq 1$ in formula (1) above).

(i) Perovskite type complex oxide

In formula (1) above, it is preferable that the x value of the perovskite type complex oxide denotes a value generally greater than 0 and preferably 0.1 or greater, and in general less than 0.7 and preferably 0.6 or less. The inventors found that the PM combustion start temperature is stably lowered in the above-mentioned range. That is, it is suited for DPF and can achieve outstanding catalyst activities. When x exceeds 0.7, the PM combustion start temperature rapidly rises. It is assumed that this is attributed to the amount of alkaline earth metals (Ba, etc.) which rapidly reduces the specific surface area of the perovskite type complex oxide particles when their amount exceeds a predetermined level.

Furthermore, in formula (1) above, y denotes generally a figure of 0 or greater and 1 or smaller.

In general, the smaller the y value, the more improved the durability of DPF to the working temperature. This is because the smaller the y value, the more enabled is it to combust PM in the state of lower DPF carrier temperature, and the more enabled is it to use DPF of the present invention at lower temperature. That is, the smaller the y value, the lower the working temperature of DPF of the present invention can be suppressed to. Consequently, from the viewpoint of durability to the working temperature, y=0 is particularly preferable. Meanwhile, in the case of y=0, formula (1) becomes the same as that expressed by "$La_{1-x}Ba_xFeO_3$" (x is the same as that of formula (1)).

On the other hand, it is possible to improve the PM combustibility as the y value increases. That is, it becomes possible to suppress the PM temperature to a low level when PM begins combustion as the y value increases. Consequently, from the viewpoint of PM combustibility, y=1 is particularly preferable. Meanwhile, in the case of y=1, formula (1) becomes the same as that expressed by "$La_{1-x}Ba_xMnO_3$" (x is the same as that of formula (1) ). Meanwhile, in this case, because heat is generated by PM combustion and the atmosphere and the carrier temperature increase, heat resistance of the catalyst material is required, and increasing the PM combustibility does not always result in suppressing the DPF working temperature as it is.

Furthermore, the perovskite type complex oxide related to the present invention has a crystal structure as shown in FIG. 1. Specifically, in FIG. 1, in the site shown by reference numeral 1, La or Ba exists, in the site shown by reference numeral 2, O exists, and in the site shown by reference numeral 3, Mn or Fe exists. Meanwhile, FIG. 1 is a schematic view explaining the perovskite structure.

The perovskite type complex oxide related to the present invention generally exists in the form of particles. There is no particular limitation to the size of particles but in the event that porous material with fine pores formed is used as a DPF carrier, it is preferable that the particle diameter of the perovskite type complex oxide related to the present invention is made smaller than the fine pore diameter of the DPF carrier. By this, it becomes possible to support the perovskite type complex oxide related to the present invention even in fine pores and it becomes possible to still more increase the site in which the perovskite type complex oxide related to the present invention is brought in contact with PM. Accordingly, it becomes possible to combust PM efficiently. Furthermore, since the perovskite type complex oxide no longer blocks the fine pores, it becomes possible to suppress pressure loss, also.

Figure 2:
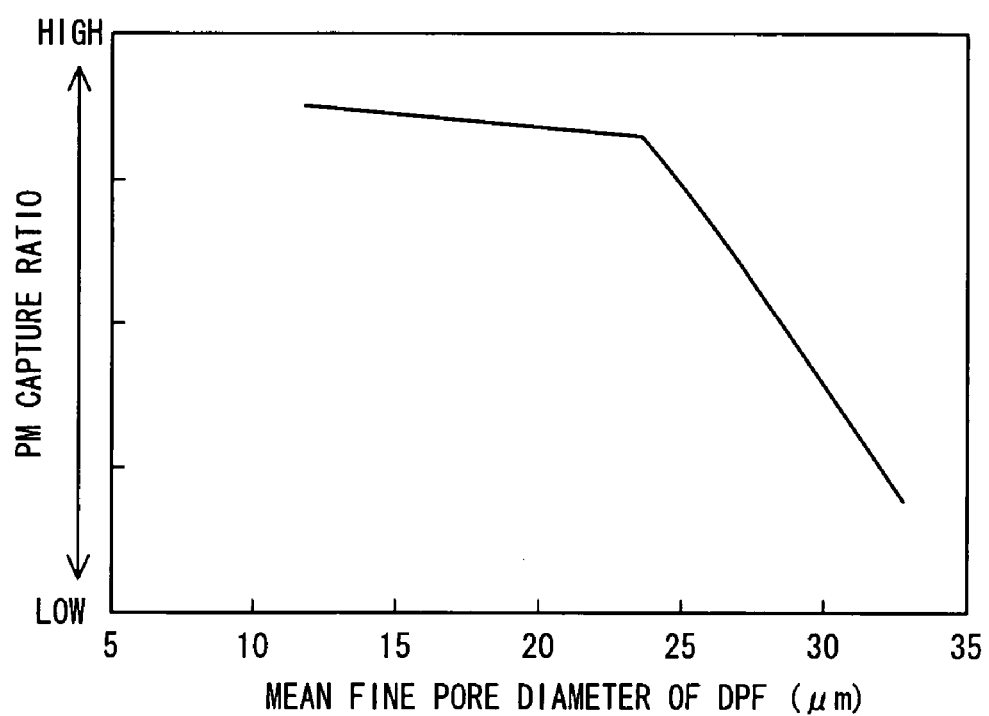
FIG. 2 is a graph showing the mean fine pore diameter of DPF carrier and PM capture rate.

Furthermore, for the fine pore diameter of the DPF carrier, the PM capture rate is degraded when the mean fine pore diameter becomes greater than 25 μm as shown in FIG. 2, and when it is smaller than this, the capture rate can be kept high but the pressure loss at the end increases and the output degradation results. Consequently, the fine pore diameter of DPF carrier is preferably between 15 μm and 25 μm. Meanwhile, the particle diameter of perovskite type complex oxide related to the present invention indicates the mean particle size and can be measured by laser diffraction/scattering particle size distribution analyzer (LA-300 available from Horiba, Ltd.). On the other hand, the fine pore diameter of carrier means the most frequent fine pore diameter and is able to be measured by the mercury penetration method (Autopore 9500 available from Shimadzu Corporation).

Furthermore, the support amount of perovskite type complex oxide in DPF of the present invention is not limited and arbitrary, but in general, it is 10 grams or more and 100 grams or less per 1 liter of DPF of the present invention. Lowering the lower limit of this range might prevent PM from being properly combusted and exceeding the upper limit clogs the DPF filter and might result in the reduced output caused by pressure loss. Meanwhile, two kinds or more of the perovskite type complex oxide of varying compositions may be used in arbitrary combinations and at arbitrary ratios. In such event, it is preferable to keep the total support amount of the used perovskite complex oxides related to the present invention to be included in the above-mentioned range.

There is no limitation to the manufacturing method of perovskite complex oxide related to the present invention and any arbitrary method can be used. For example, materials which contain La, Ba, Mn and Fe, respectively (for example, simple substance, oxide, nitride, etc.), are prepared, mixed, and recrystallized by appropriate solvents at the ratio in accordance with the composition of the perovskite type complex oxide to be obtained, and perovskite type complex oxides can be obtained by firing at a predetermined temperature (for example, 1000° C.) for a predetermined time (for example, 8 hours). In addition, in general, the product obtained is crushed and made into particles.

In addition, there is no limitation to the method for supporting the perovskite type complex oxides obtained with DPF carriers, and any arbitrary methods can be used. For example, binders such as aluminasol, etc. are mixed with the perovskite type complex oxides of the present invention, and using the mixture, the DPF carrier is coated, and the perovskite type complex oxide is carried by the DPF carrier.

Figure 3:
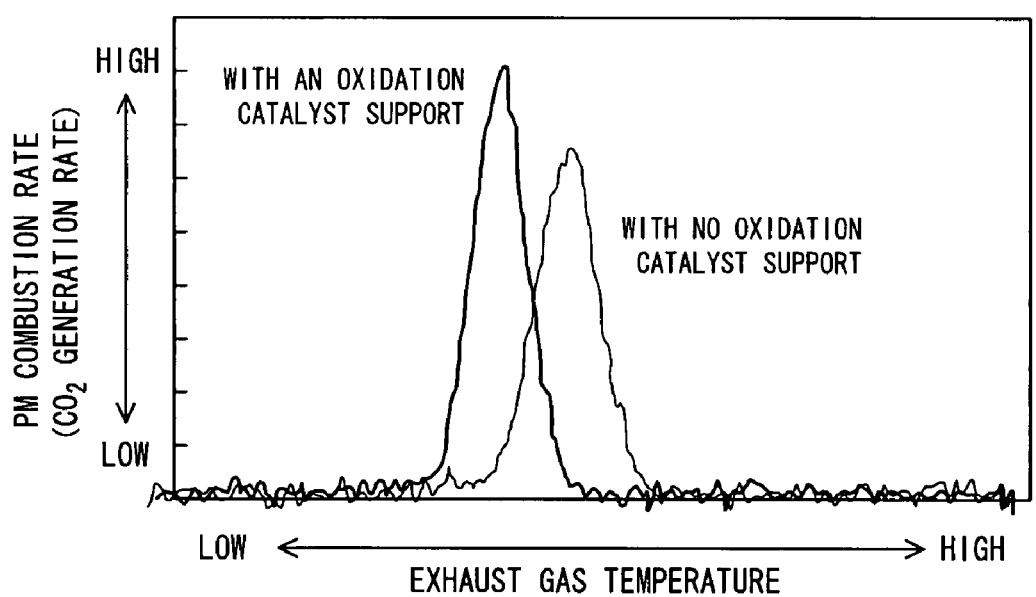
FIG. 3 is a diagram showing lowering of oxidation temperature of PM by adding noble metals.

Meanwhile, it is not certain why using the perovskite type complex oxide related to the present invention can lower the PM combustion start temperature than in the conventional technique, but it could be presumed as follows. That is, in the perovskite complex related to the present invention, oxygen transfer by lattice defect of perovskite becomes much easier by containing Ba. Therefore, it is presumed that when oxygen contained in exhaust gas is adsorbed by perovskite, the oxygen is likely to be released as radical oxygen, and this makes it possible to combust PM accumulated on DPF at low temperature. In addition, as shown in FIG. 3, by allowing the oxidation catalyst to be supported by a carrier which supports the perovskite type complex oxide, reactions of NO in the exhaust gas with radial oxygen generated by perovskite are promoted by the existence of the oxidation catalyst. As a result, it is presumed that NO is oxidized at still lower temperature and $NO_2$ is generated, and combustion reactions with PM are promoted. Meanwhile, FIG. 3 is a diagram showing lowering of oxidation temperature of PM by adding an oxidation catalyst.

(ii) Oxidation catalyst

The oxidation catalyst related to the present invention is the material which contains at least one kind of noble metal chosen from Pt, Rh and Pd.

In addition, the oxidation catalyst related to the present invention may be mounted in the exhaust gas passage, and it is arbitrary where the oxidation catalyst is installed in the exhaust gas passage.

For example, the oxidation catalyst related to the present invention may exist in the carrier which supports the perovskite type complex oxide. That is, the above-mentioned DPF carrier may be configured to have the oxidation catalyst and the perovskite type complex oxide related to the present invention. In such event, how they exist is arbitrary as far as they are supported by the relevant carrier. In general, the oxidation catalyst is fixed to the carrier and used but in such event, it is desirable for the oxidation catalyst to be supported in the fine pore of the carrier, also. By this, it becomes possible to increase the support rate of the oxidation catalyst.

In addition, for example, the oxidation catalyst related to the present invention may exist in the former-stage or the latter-stage of the DPF carrier as the catalyst (catalyst unit) different from the DPF carrier which supports the perovskite type complex oxide. That is, in the exhaust gas passage, a catalyst (catalyst unit) which supports the oxidation catalyst and a DPE carrier (filter unit) which supports the perovskite type complex oxide related to the present invention may be installed. In such event, also, how the oxidation catalyst exists is arbitrary. In general, an oxidation catalyst is coated to an oxidation catalyst carrier to form a catalyst unit (catalyst), and this catalyst unit is disposed at a predetermined position in the exhaust gas passage to install a catalyst. Meanwhile, as the oxidation catalyst carrier used in such event, arbitrary carriers used for the exhaust gas catalyst may be used.

The use amount of the oxidation catalyst related to the present invention is not limited and is arbitrary unless it markedly impair the effects of the present invention. However, in order to achieve the advantages of using the oxidation catalyst in combination with the perovskite type complex oxide, it is desirable to use, in general, 1% by weight or more and 50% by weight or less with respect to the perovskite type complex oxide.

There is no limitation to the method for allowing the carrier (including oxidation catalyst carriers) to support the oxidation catalyst related to the present invention. In general, a desired amount of noble metal is impregnated with the perovskite material in the form of salts and complexes, and thereafter, the DPF carrier is allowed to support the oxidation catalyst by drying and firing. Also, a desired amount of noble metal is adsorbed to the DPF carrier which supports the perovskite in the form of salts or complexes, and dried and fired.

According to the oxidation catalyst related to the present invention, oxidation of fuel in exhaust gas as well as unburned ingredients such as NO, CO, etc. can be promoted. Consequently, with this oxidation catalyst and perovskite type complex oxide being supported by the DPF carrier, oxidation of PM accumulated on the DPF carrier can be promoted and the PM combustion start temperature may be lowered than in conventional technique.

Meanwhile, depending on the conditions, there are cases in which the effects of the present invention may be obtained without installing the oxidation catalyst.

[I-3. Other configurations]

To the DPF system of the present invention, constituent elements other than the carrier and the perovskite type complex oxide related to the present invention may be equipped unless they markedly impair the effects of the present invention.

For example, the carrier may be allowed to support a catalyst other than the perovskite type complex oxide related to the present invention and an oxidation catalyst, in addition to the perovskite type complex oxide and the oxidation catalyst related to the present invention.

[II. Embodiment]

Referring now to drawings, one embodiment of the present invention will be described, but the present invention is not limited by the following embodiment but may be arbitrarily modified and put into effect without departing from the spirit of the invention.

Figure 4:
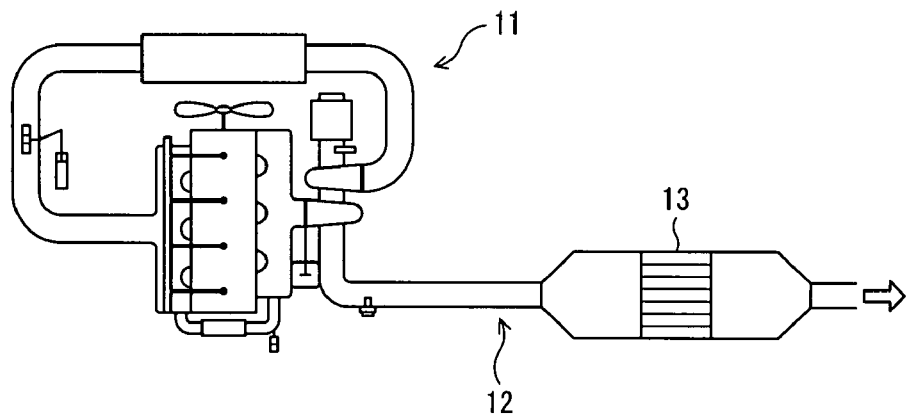
FIG. 4 is a schematic diagram showing an exhaust system of a diesel engine equipped with a DPF system as one embodiment of the present invention.

FIG. 4 is a schematic diagram showing an exhaust system of a diesel engine equipped with a DPF system as one embodiment of the present invention.

As shown in FIG. 4, in the exhaust system of the present embodiment, as the DPF system, DPF 13 which is DPF of the present invention is installed to an exhaust pipe 12 of a diesel engine 11. Meanwhile, in this event, DPF 13 is configured by allowing a porous carrier formed by cordierite to support the oxidation catalyst (for example, at least one kind chosen from Pt, Rh, and Pd) as catalysts and the perovskite type complex oxide expressed by formula (1) above.

And in the exhaust system of the present embodiment, exhaust gas discharged from the diesel engine 11 is released through the exhaust pipe 12. In this event, before exhaust gas is released to the outside of the exhaust system, the exhaust gas passes DPF 13. Consequently, PM is captured at DPF 13 while it goes through the exhaust system, and accumulates in DPF 13, and PM is removed from the exhaust gas.

The exhaust system of the present embodiment is configured as described above, and is used as described above. In such event, since DPF 13 has the oxidation catalyst and the perovskite type complex oxide related to the present invention expressed by formula (1) mentioned above, the PM combustion start temperature in DPF 13 can be lowered than in the conventional technique. Consequently, even at the low ambient temperature as is the case of that at the time of normal operation, PM is combusted by the heat of exhaust gas and DPF 13 can be regenerated. Accordingly, in the present embodiment, DPF 13 can be continuously regenerated.

In addition, because the above-mentioned perovskite type complex oxide does not contain any alkali metal, the carrier using Si, etc. is not deteriorated, either. Consequently, it is one of the advantages of the present embodiment that the material containing Si can be used for the carrier.

Furthermore, it is one of the advantages of the present embodiment that it becomes possible to configure DPF without using any expensive carrier with high heat resistance such as SiC because the PM combustion start temperature lowers, and the cost of the DPF system can be suppressed.

In addition, it is also one of the advantages of the present embodiment that it is possible to suppress the fuel economy because no fuel injection is required for heating the exhaust gas since the PM combustion start temperature lowers.

[III. Miscellaneous]

As described above, the present invention has been explained by showing one embodiment, but the present invention shall not be limited to the above-mentioned embodiment but may be arbitrarily modified and put into effect without departing from the spirit of the invention.

Figure 5:
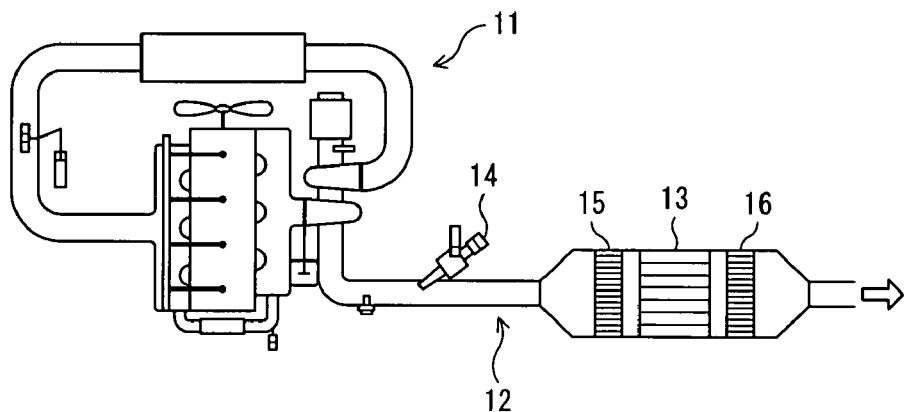
FIG. 5 is a schematic diagram showing an exhaust system of a diesel engine equipped with a DPF system as a modified example of the present invention.
Figure 6:
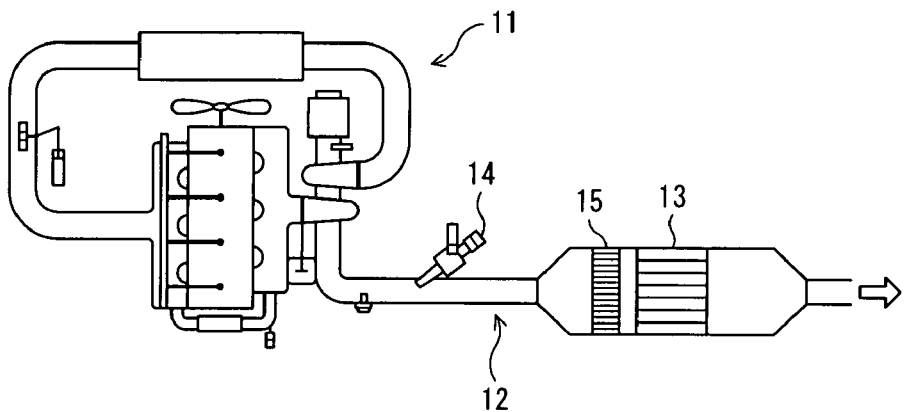
FIG. 6 is a schematic diagram showing an exhaust system of a diesel engine equipped with a DPF system as an another modified example of the present invention.

For example, an injector 14 may be installed in the exhaust pipe 12 as schematically shown in FIG. 5 and FIG. 6 to meet the cases in which the exhaust gas temperature does not reach sufficiently high temperature to definitely combust PM (for example, at the start of operation). That is, by installing the injector 14 in the exhaust pipe 12 as shown in FIG. 5 and FIG. 6 fuel is injected from the injector 14 to raise the temperature of exhaust gas when the exhaust gas is not heated sufficiently to high temperature, and can definitely regenerate DPF by definitely combusting PM. Meanwhile, FIG. 5 and FIG. 6 show modified examples of the embodiment, respectively, and portions same as those in FIG. 4 are shown by the same reference characters used in FIG. 4.

In addition, in such event, a latter-stage oxidation catalyst 16 may be installed to the latter-stage (downstream part) of DPF 13 and a former-stage oxidation catalyst 15 is installed to the former-stage (upstream part) of DPF 13 as shown in FIG. 5. For these former-stage oxidation catalyst 15 and latter-stage oxidation catalyst 16, the oxidation catalyst related to the present invention is allowed to be supported. In such event, the DPF system of the present invention is configured with DPF 13, the former-stage oxidation catalyst 15 and the latter-stage oxidation catalyst 16.

Because according to the configuration as shown in FIG. 5, combustion of fuel is promoted by the former-stage oxidation catalyst 15, the exhaust gas temperature can be raised to the PM combustion start temperature at the time of fuel injection. In addition, even when slip HC remains in the exhaust gas due to imperfect combustion of some of the fuel, the latter-stage oxidation catalyst 16 can definitely combust the slip HC in the latter-stage oxidation catalyst 16 and can prevent the slip HC from remaining in the exhaust gas discharged from the exhaust system. In such event, the PM combustion start temperature is lowered by the perovskite type complex oxide related to the present invention and in addition, the uncombusted fuel portion in the exhaust gas can be allowed to react by the former-stage oxidation catalyst 15, the exhaust gas temperature rises, and it is possible to reduce the fuel injection rate and can suppress the fuel economy as compared to the conventional cases. In addition, since the volume of the former-stage oxide catalyst 15 and the latter-stage oxide catalyst 16 can be reduced, a compact catalyst system can be built. Meanwhile, in such case, the use of the oxidation catalyst can raise the exhaust gas temperature. Consequently, it is possible to achieve the advantages similar to the embodiment without installing the injector 14.

Furthermore, as shown in FIG. 6, the former-stage oxidation catalyst 15 is installed at the former-stage part (upstream part) of DPF 13 and no oxidation catalyst (see latter-stage oxidation catalyst 16 of FIG. 5) is installed to the latter-stage part (downstream part) of DPF 13. In such event, the DPF system of the present invention is configured with DPF 13 and the former-stage oxidation catalyst 15. This is because even if no oxidation catalyst is installed to the latter-stage of DPF 13, it is possible to lower the PM combustion start temperature by the perovskite type complex oxide related to the present invention and it is possible to reduce the amount of fuel injected from the injector 14 to reduce the amount of slip HC by raising the exhaust gas temperature by the former-stage oxidation catalyst 15, and therefore, there is little possibility for slip HC to remain in the exhaust gas discharged from the exhaust system. In such event, because the oxidation catalyst is not installed to the latter stage of DPF, a still more space-saving catalyst system than the configuration stipulated in FIG. 5 can be constructed.

EXAMPLE

Now, showing examples, the present invention will be explained specifically but the present invention is not limited by the following embodiment but may be arbitrarily modified and put into effect without departing from the spirit of the invention.

Examples 1 through 7 and Comparison Example 1 through 4

The perovskite type complex oxides were fabricated as follows.

Based on the fabrication method stipulated in Japanese Patent Application Laid-Open No. 2005-187311, particles were fabricated. For raw materials, lanthanum nitrate $La(NO_3)_3 \cdot 6H_2O$, barium nitrate $Ba(NO_3)_2$, iron nitrate $Fe(NO_3)_3 \cdot 9H_2O$, are mixed in such a manner that the mol ratio of La to Ba to Fe becomes (1-x):x:1. x was varied in the range from 0 to 1. By mixing this material salt solution with a neutralizing agent, a coprecipitate was obtained. After filtering this, the filtrate was washed with water and dried at 110° C. The powder obtained is called the precursor powder.

Then, this precursor powder is fabricated by firing after heat-treating at 800° C. for 2 hours under the atmospheric environment.

Figure 7:
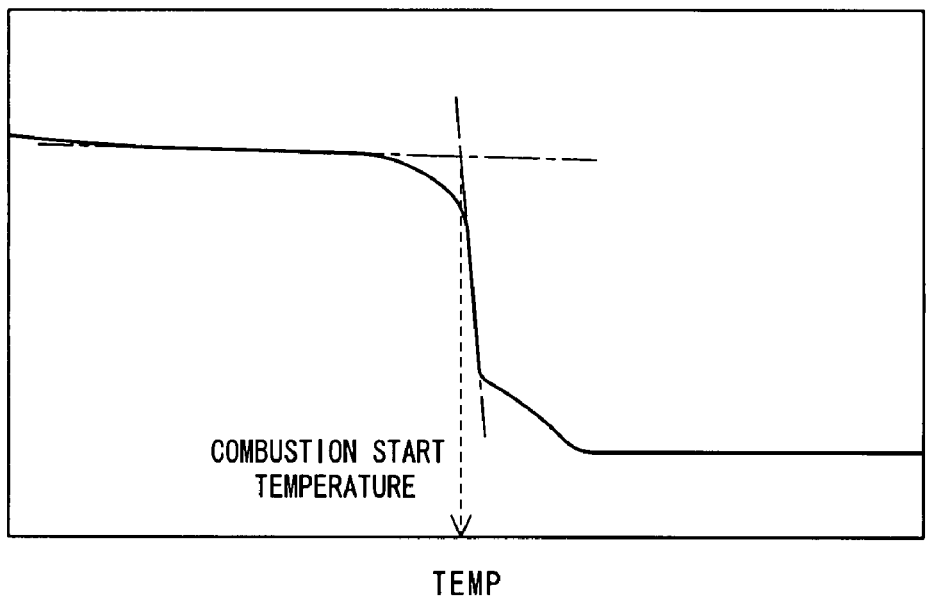
FIG. 7 is a diagram schematically showing a method to find the combustion start temperature from a TG curve.

Each powder of perovskite type complex oxides after firing was mixed with simulated PM. For the simulated PM, carbon black (mean particle size: 2.09 μm) available from Mitsubishi Chemical Corporation was used, and weighing was carried out in such a manner that the mass ratio of perovskite type complex oxide to the simulated PM became 6 to 1, and the materials were mixed for 20 minutes by automatic mortar. From the obtained mixture sample, 20 mg was separated, and this was set to a TG/DTA apparatus (TG/DTA6300 type available from Seiko Instruments Inc.). In the atmosphere, the rate of temperature rise was adjusted to 10° C./min and TG measurement was conducted in the temperature range from 50° C. to 700° C. The data obtained were analyzed by the use of EXSTER 300 type data analyzer. The combustion start temperature was found by designating the intersection between a tangential line before the weight reduction begins and a tangential line at the point where the weight reduction ratio (angle) is maximized in the TG curve. FIG. 7 schematically shows how it is found.

Figure 8:
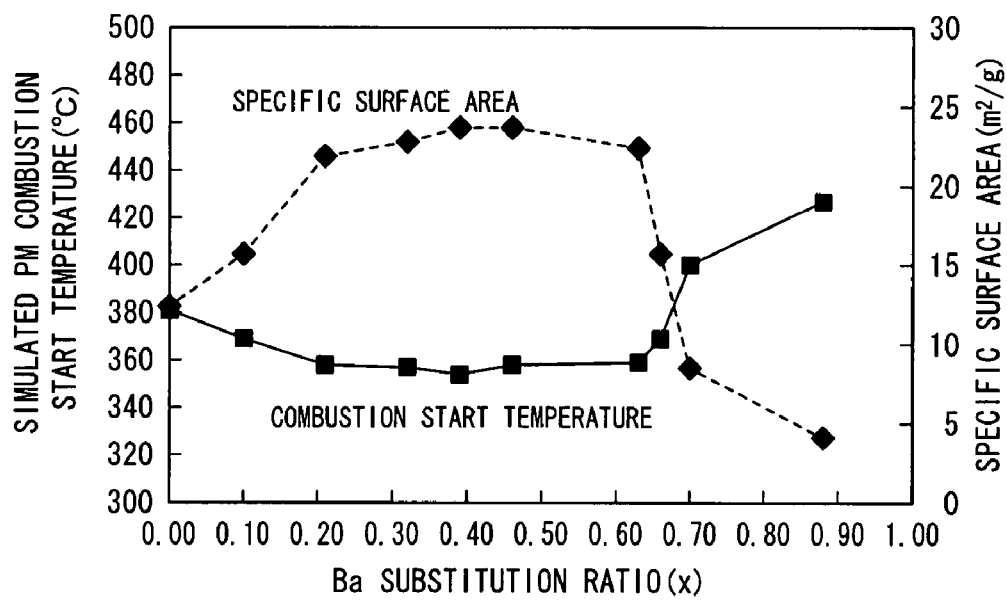
FIG. 8 is a graph showing the results of Examples 1 through 7 and Comparative Examples 1 through 4, and is a graph showing changes in the simulated PM combustion start temperature and specific surface area when the Ba substitution ratio is varied in $La_{1-x}Ba_xFeO_3$.

In addition, for perovskite type complex oxides of various compositions, after crushing them in an agate mortar, the specific surface area was found by the BET method. Table 1 and FIG. 8 show experimental results of the combustion start temperature computed from TG/DTA and the specific surface area value by the BET method, respectively. Meanwhile, in Table 1, the numerical values in the composition column indicate the composition ratio of elements (La, Ba and Fe) which correspond to each column.

In addition, with respect to the composition analysis of whole powder particles, Ba and La were determined by the use of ICP: inductively coupled plasma emission spectrometer (IRIS/AP available from Nippon Jarrell Ash) and Few as determined by an automatic titrator (COMTIME-980 available from Hiranuma Sangyo Corporation). In addition, the specific surface area was computed by the use of BET method. Furthermore, for the numerical values of compositions, values of La and Ba when Fe is set 1 are shown.

TABLE 1

| Table 1 | Composition | | | Specific surface area $(m^2/g)$ | Simulated PM combustion start temperature (° C.) |
| --- | --- | --- | --- | --- | --- |
| | La | Ba | Fe | | |
| Comparison Example 1 | 1.05 | 0.00 | 1.0 | 12.4 | 381 |
| Example 1 | 0.96 | 0.10 | 1.0 | 16.5 | 367 |
| Example 2 | 0.86 | 0.21 | 1.0 | 21.9 | 358 |
| Example 3 | 0.82 | 0.32 | 1.0 | 22.8 | 357 |
| Example 4 | 0.62 | 0.39 | 1.0 | 23.7 | 354 |
| Example 5 | 0.53 | 0.46 | 1.0 | 23.7 | 358 |
| Example 6 | 0.45 | 0.63 | 1.0 | 22.4 | 359 |
| Example 7 | 0.34 | 0.66 | 1.0 | 15.7 | 369 |
| Comparison Example 2 | 0.23 | 0.70 | 1.0 | 8.5 | 400 |
| Comparison Example 3 | 0.11 | 0.88 | 1.0 | 4.1 | 427 |
| Comparison Example 4 | Pt/Al$_2$O$_3$ | | | | 533 |

As clear from FIG. 8, in the range of 0.0<x<0.7, the combustion start temperature of simulated PM is lowered to 370° C. or lower and in the range, the BET specific surface area was increased. Where X is in the range from 0.1 to 0.6, the combustion start temperature of simulated PM becomes low and high specific surface area was stably indicated. Based on these, it was confirmed that there is a proper range in the mol ratio of rare-earth element (La) to alkaline-earth metal (Ba) and in the range where a high specific surface area is obtained, outstanding reduction effects of the PM combustion start temperature is able to be obtained. In particular, the upper limit value of x=0.7 has a critical property where satisfactory results are obtained. In addition, of the compositions which correspond to the foregoing, the PM combustion properties were evaluated at y=0 and 1 when x=0.2, respectively. The evaluations were conducted under the conditions shown in the following examples. The results are shown, also.

Example 8

Figure 9:
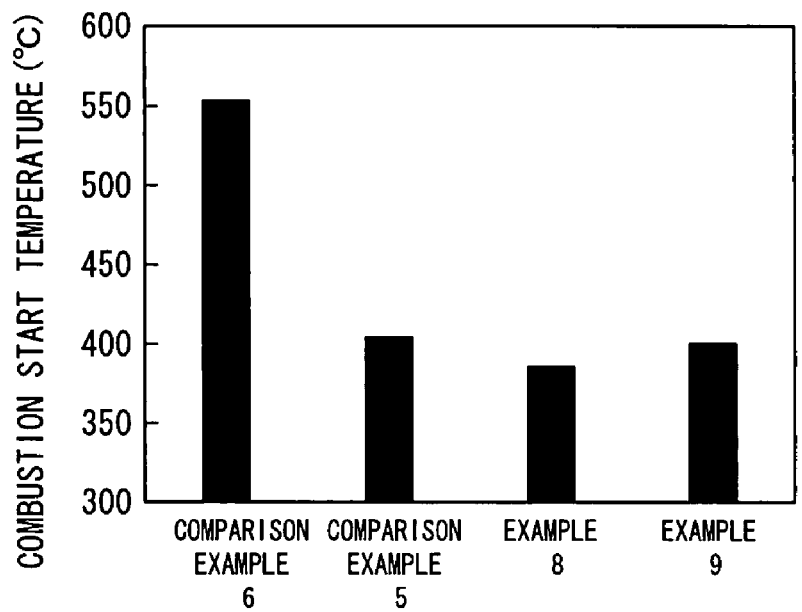
FIG. 9 is a graph showing the results of Examples 8 and 9 of the present invention and Comparative Examples 5 and 6.

$La_{0.8}Ba_{0.2}FeO_3$ which is a perovskite type complex oxide and the simulated PM were weighed to achieve the 6-to-1 mass ratio and 8.5 mg of the powder mixture was heated at 20° C./min in the air atmosphere using a thermobalance and the combustion start temperature was obtained. FIG. 9 shows the results.

Example 9

Except for $La_{0.8}Ba_{0.2}MnO_3$ used for the perovskite type complex oxide, same as in Example 1, the combustion start temperature was found by the use of a thermobalance. FIG. 9 shows the results.

Comparison Example 5

Except for almina and $K_2CO_3$ (1.3wt %) used in place of the perovskite type complex oxide, same as in Example 8, the combustion start temperature was found by the use of a thermobalance. FIG. 9 shows the results.

Comparison Example 6

The combustion start temperature of carbon (simulated material of PM) only was found by the use of a thermobalance without using any perovskite type complex oxide. FIG. 9 shows the results.

Example 10

$La_{0.8}Ba_{0.2}FeO_3$ which is a perovskite type complex oxide was crushed for 1 hour by the use of a wet ball-mill and powders of 2 μm mean particle size (hereinafter called arbitrarily "perovskite") were obtained. The obtained perovskite was dried and aluminasol (available from Nissan Chemical Industries, Ltd.) was mixed in such an amount as to achieve 15% by weight of the weight of the perovskite in the concentration of alumina (in terms of $Al_2O_3$). To the mixture, deionized water was added to have an aqueous solution containing 10 weight % solids and was mixed by a ball mill for 1 hour.

This aqueous solution was uniformly poured from one side of 2.5 L of DPF carrier which was allowed to support 50 g/L (total of 125 g) as the perovskite weight. After supporting, it was dried at 150° C. for 3 hours, fired at 500° C., and DPF (perovskite supporting DPF) was obtained.

Figure 10:
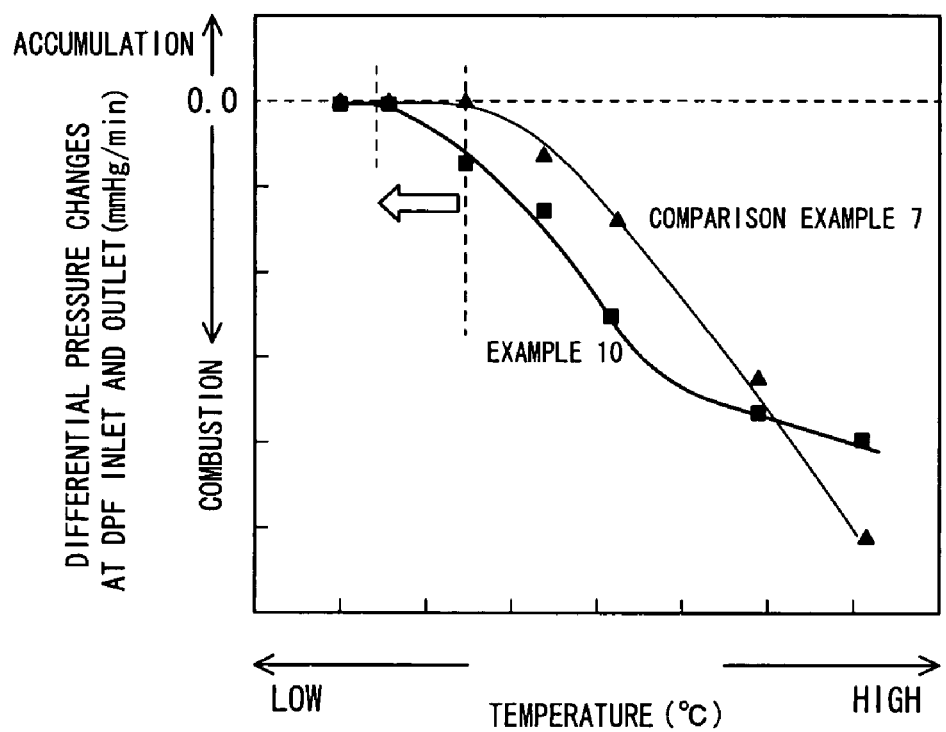
FIG. 10 is a graph showing the results of Example 10 of the present invention and Comparative Example 7.

To the DPF obtained, using a diesel engine, PM in exhaust gas was accumulated at 5 g/L (total of 12.5 g). For the catalyst layout configuration, the oxidation catalyst was located at the diesel engine exhaust outlet and DPF downstream of the oxidation catalyst. The diesel engine load was kept constant and by increasing the rotating speed, temperature at the DPF inlet was operated to increase stepwise. FIG. 10 shows the results of PM combustion temperature found from changes of pressures at the DPF inlet and outlet at a constant temperature. That is, PM combustion began when the values of pressure changes at the DPF inlet and outlet became negative.

[Comparison 7]

Except for using the Pt solution (containing 3 g as Pt) in place of the perovskite type complex oxide, DPF was fabricated in the same manner as Example 10 and the combustion start temperature of carbon (simulated material of PM) accumulated on the DPF was found. FIG. 10 shows the results.

[Discussion]

As clear from FIG. 9, according to Examples 8 and 9 and Comparisons 5 and 6, it has been confirmed that the PM combustion start temperature can be lowered without deteriorating the carrier containing Si because no alkali metal is contained when DPF using the perovskite type complex oxide related to the present invention is used. In addition, as clear from FIG. 10, the temperature which indicates the negative pressure difference before and after DPF comes to the lower temperature side in Example 10 than in Comparison 7. Based on this, even when the in-service DPF is fabricated, it is possible to lower the PM combustion start temperature with DPF which supports the perovskite type complex oxide of the present embodiment as compared with that of DPF which supports Pt as shown in Comparison 7.

INDUSTRIAL APPLICABILITY

The present invention can be applied to diesel engines used, for example, vehicles, construction machinery, agricultural machinery, marine vessels, internal-combustion power generation, etc.

What is claimed is:

1. A diesel particulate filter, comprising:
   a carrier which has filter functions, wherein fine pores are formed in said carrier; and
   a perovskite type complex oxide in particulate form supported by said carrier and expressed by the following formula (1):

    (1)

in which $0<x<0.7$ and $0\leq y\leq 1$,
   wherein the particle diameter of the perovskite type complex oxide is smaller than the fine pore diameter of said carrier.

2. The diesel particulate filter according to claim 1 wherein $0.1\leq x\leq 0.6$ in formula (1) above.

3. The diesel particulate filter according to claim 1 wherein $y=0$ in formula (1) above.

4. The diesel particulate filter according to claim 1 wherein $y=1$ in formula (1) above.

5. The diesel particulate filter according to claim 1 further comprising an oxidation catalyst containing at least one element selected from the group consisting of Pt, Rh, and Pd, which is supported by a carrier.

6. An exhaust emission control system installed in an exhaust gas passage of a diesel engine, comprising:
   a diesel particulate filter that comprises a carrier which has filter functions and a perovskite type complex oxide supported by said carrier and expressed by the following formula (1); and
   a carrier which supports an oxidation catalyst installed separately from the diesel particulate filter:

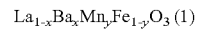 (1)

(where $0<x<0.7$ and $0\leq y\leq 1$ in formula (1) above).

7. An exhaust emission control system installed in an exhaust gas passage of a diesel engine, comprising:
   a diesel particulate filter that comprises a carrier which has filter functions and a perovskite type complex oxide supported by said carrier and expressed by the following formula (1); and
   a carrier which supports an oxidation catalyst installed separately from the diesel particulate filter:

$La_{1-x}Ba_xMn_yFe_{1-y}O_3$    (1)

(where $0.1\leq x\leq 0.6$ and $0\leq y\leq 1$ in formula (1) above).

8. An exhaust emission control system installed in an exhaust gas passage of a diesel engine, comprising:
   a diesel particulate filter that comprises a carrier which has filter functions and a perovskite type complex oxide supported by said carrier and expressed by the following formula (1); and
   a carrier which supports an oxidation catalyst installed separately from the diesel particulate filter:

    (1)

(where $0<x<0.7$ and $y=0$ in formula (1) above).

9. An exhaust emission control system installed in an exhaust gas passage of a diesel engine, comprising:
   a diesel particulate filter that comprises a carrier which has filter functions and a perovskite type complex oxide supported by said carrier and expressed by the following formula (1); and
   a carrier which supports an oxidation catalyst installed separately from the diesel particulate filter:

    (1)

(where $0<x<0.7$ and $y=1$ in formula (1) above).

10. An exhaust emission control system installed in an exhaust gas passage of a diesel engine, comprising:
    a diesel particulate filter that comprises a carrier which has filter functions and a perovskite type complex oxide supported by said carrier and expressed by the following formula (1), wherein the perovskite type complex oxide exists in a particulate form, fine pores are formed in the carrier, and the particle diameter of the perovskite type complex oxide is smaller than the fine pore diameter of the carrier; and
    a carrier which supports an oxidation catalyst installed separately from the diesel particulate filter:

    (1)

(where $0<x<0.7$ $0\leq y\leq 1$ and in formula (1) above).

11. An exhaust emission control system installed in an exhaust gas passage of a diesel engine, comprising:
    a diesel particulate filter that comprises
      a carrier which has filter functions,
      a perovskite type complex oxide supported by said carrier and expressed by the following formula (1)

    (1)

in which $0<x<0.7$ $0\leq y\leq 1$, and
an oxidation catalyst containing at least one element selected from the group consisting of Pt, Rh, and Pd, which is supported by said carrier; and
a carrier which supports an oxidation catalyst installed separately from the diesel particulate filter.

* * * * *